June 11, 1929.  S. AOKI  1,717,299
ELECTRICAL SYSTEM
Filed May 17, 1927
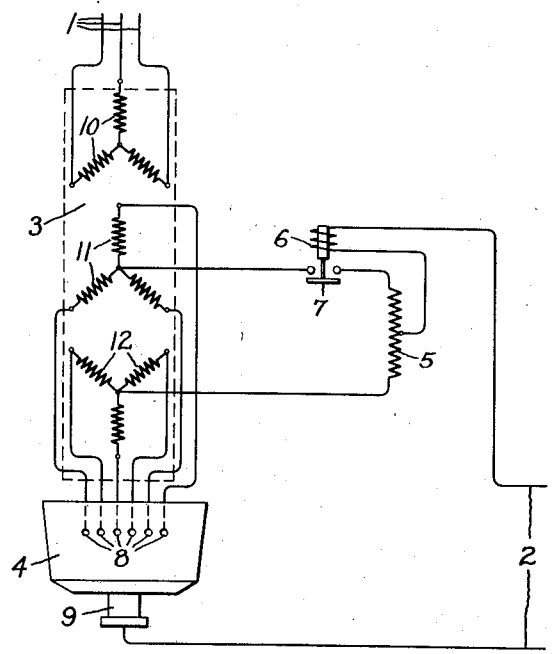
Inventor:
Sataro Aoki,
by His Attorney.

Patented June 11, 1929.

1,717,299

UNITED STATES PATENT OFFICE.

SATARO AOKI, OF HIRATSUKA, JAPAN, ASSIGNOR TO GENERAL ELECTRIC COMPANY, A CORPORATION OF NEW YORK.

ELECTRICAL SYSTEM.

Application filed May 17, 1927, Serial No. 192,136, and in Japan August 19, 1926.

My invention relates to electrical systems wherein current is transmitted between direct and alternating current circuits through a valve apparatus, and has for its principal object the provision of an improved means for controlling the relation between the electrical conditions of such circuits.

It is well known that, in the operation of a rectifying or a derectifying apparatus comprising a plurality of anodes, current is successively carried by each of the anodes during a period of time dependent on the number of phases and the frequency of the alternating current delivered or received by the apparatus; that the period of current transmission through each anode of the apparatus may be lengthened by interposing an interphase transformer in the circuit interconnecting the direct and alternating current circuits; and that lengthening the time of current transmission through each anode of the apparatus decreases the average value of the direct current voltage where the apparatus is supplied with current from a constant potential source of alternating current and produces a corresponding change in the relation between the direct and alternating voltages where current is supplied to the apparatus from a direct current source of constant potential. Under these conditions the direct current voltage tends to assume an excessively high value when the current transmitted between the circuits becomes small. In accordance with my invention, this undesirable result is avoided by the provision of means operable to interrupt a connection of the interphase transformer when the load of the direct current circuit decreases to a predetermined value. A further feature of my invention is the use of the interphase transformer as a smoothing reactor after the interruption of one of its connections.

My invention will be better understood from the following description when considered in connection with the accompanying drawings and its scope will be pointed out in the appended claims.

The drawing is a wiring diagram of a rectifying system wherein my invention has been embodied.

This system comprises alternating current terminals 1 and direct current terminals 2 which are interconnected through means comprising a transformer 3, a mercury rectifier 4, an interphase transformer 5 and the operating coil 6 of a relay switch 7. It will be observed that the rectifier 4 is provided with a plurality of anodes 8 and a cathode 9; and that the transformer comprises a polyphase primary winding 10 and polyphase secondary windings 11 and 12 which have their end terminals each connected to a different one of the anodes 8 and have their neutrals interconnected through the interphase transformer 5 and the relay switch 7.

With these connections the rectifier 4 operates as a double three-phase rectifier so long as the load of the circuit 2 exceeds a predetermined value, and the voltage of this circuit is maintained within its normal range of values. When the load of the circuit 2 becomes small, however, the rectifier 4 tends to operate as a straight six-phase rectifier with an excessively high direct current voltage. This result is prevented by the switch 7 which opens in response to decrease in the direct current load and causes the three anodes connected to the winding 12 to transmit all the current. As previously indicated, the lower part of the interphase transformer 5 is utilized during this part of the operation as a smoothing reactor.

The embodiment of the invention illustrated and described herein has been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States, is:—

1. The combination of a pair of direct current terminals, a rectifier provided with a cathode connected to one of said terminals and with a plurality of anodes, an interphase transformer connected to the other of said terminals at a point intermediate its ends, polyphase transformer windings interconnected through said interphase transformer and provided with end terminals each connected to a different one of said anodes, and means operable to disconnect one of said polyphase windings from said interphase transformer when a predetermined electrical connection exists at said terminals.

2. The combination of direct and alternating current terminals, a rectifier provided with a cathode connected to one of said direct current terminals and with a plurality of anodes, an interphase transformer connected to another of said direct current terminals, a transformer connected between said anodes and said alternating current terminals and provided with polyphase windings interconnected through said interphase transformer, and means responsive to an electrical condition of one of said terminals for controlling the connection between said interphase transformer and one of said polyphase windings.

3. The combination of direct and alternating current terminals, a rectifier provided with a cathode connected to one of said direct current terminals and with a plurality of anodes, an interphase transformer connected to another of said direct current terminals, a transformer connected between said anodes and said alternating current terminals and provided with polyphase windings interconnected through said interphase transformer, and a switch comprising an operating coil connected in one of said direct current terminals and arranged to control the connection between said interphase transformer and one of said polyphase windings.

In witness whereof, I have hereunto set my hand this twenty-sixth day of April, 1927.

SATARO AOKI.